(12) United States Patent
Jacobs et al.

(10) Patent No.: US 6,288,920 B1
(45) Date of Patent: *Sep. 11, 2001

(54) DRIVE COMPENSATION CIRCUIT FOR SYNCHRONOUS RECTIFIER AND METHOD OF OPERATING THE SAME

(76) Inventors: Mark E. Jacobs, 7615 Applecross La., Dallas, TX (US) 75248; Allen F. Rozman, 2901 Wyndham La., Richardson, TX (US) 75082

( * ) Notice: Subject to any disclaimer, the term of this patent is extended or adjusted under 35 U.S.C. 154(b) by 0 days.

This patent is subject to a terminal disclaimer.

(21) Appl. No.: 09/617,618

(22) Filed: Jul. 17, 2000

Related U.S. Application Data (63) Continuation of application No. 09/176,690, filed on Oct. 21, 1998, now Pat. No. 6,091,616.

(51) Int. Cl.$^7$ .............................. H02M 7/68; H02M 7/217
(52) U.S. Cl. ................................ 363/127; 363/80; 363/89
(58) Field of Search ................................. 363/78, 80, 81, 363/82, 84, 89, 90, 127, 125

(56) References Cited

U.S. PATENT DOCUMENTS

| | | | |
|---|---|---|---|
| 4,899,271 | * 2/1990 | Seiersen | 363/126 |
| 5,274,543 | * 12/1993 | Loftus, Jr. | 363/127 |
| 5,291,382 | * 3/1994 | Cohen | 363/16 |
| 5,303,138 | * 4/1994 | Rozman | 363/21 |
| 5,434,768 | * 7/1995 | Jitaru et al. | 363/21 |
| 5,528,482 | * 6/1996 | Rozman | 363/21 |
| 5,541,828 | * 7/1996 | Rozman | 363/21 |
| 5,590,032 | * 12/1996 | Bowman et al. | 363/15 |
| 5,625,541 | * 4/1997 | Rozman | 363/21 |
| 5,636,116 | * 6/1997 | Milavec et al. | 363/89 |
| 5,663,877 | 9/1997 | Dittli et al. | 363/127 |
| 5,708,571 | * 1/1998 | Shinada | 363/16 |
| 5,734,563 | * 3/1998 | Shinada | 363/21 |
| 5,742,491 | * 4/1998 | Bowman et al. | 363/21 |
| 5,870,299 | 2/1999 | Rozman | 363/127 |
| 6,011,703 | 1/2000 | Boylan et al. | 363/21 |
| 6,069,799 | 5/2000 | Bowman et al. | 363/20 |

FOREIGN PATENT DOCUMENTS

WO 98/40961    9/1998   (WO) .......................... H02M/3/04

* cited by examiner

Primary Examiner—Peter S. Wong
Assistant Examiner—Bao Q. Vu (57) ABSTRACT

For use with a synchronous rectifier coupled to a secondary winding of a transformer and having a rectifier switch, a circuit for, and method of driving the rectifier switch and a power converter employing the circuit or the method. In one aspect of the present invention wherein the synchronous rectifier has at least first and second rectifier switches, the circuit includes: (1) a series-coupled drive winding and capacitor, coupled between a first control terminal of the first rectifier switch and a second control terminal of the second rectifier switch, that generates first and second drive signals and delivers the first and second drive signals to the first and second control terminals, respectively, and (2) first and second clamps, coupled to the first and second control terminals, respectively, that control first and second capacitive charges within the first and second rectifier switches to limit voltage excursions of the first and second drive signals.

41 Claims, 6 Drawing Sheets

DRIVE COMPENSATION CIRCUIT FOR SYNCHRONOUS RECTIFIER AND METHOD OF OPERATING THE SAME

CROSS-REFERENCE TO RELATED APPLICATIONS AND PATENTS

This application is a continuation of Ser. No. 09/176,690 filed Oct. 21 1998, now U.S. Pat. No. 6,091,616.

| Reference No. | Title | Inventor(s) | Date |
| --- | --- | --- | --- |
| 08/858,181 ('181 application) | Method and Apparatus for Damping Ringing in Self-driven Synchronous Rectifiers | Rozman | May 29, 1997 |
| 09/065,807 ('807 application) | Self-synchronized Gate Drive for Power Converter Employing Self-driven Synchronous Rectifier and Method of Operation Thereof | Boylan, et al. | April 23, 1998 |
| 09/072,370 ('370 application) | Self-synchronized Drive Circuit for a Synchronous Rectifier in a Clamped-mode Power Converter | Bowman, et al. | May 4, 1998 |
| 4,899,271 ('271 patent) | Power Supply Circuit | Seiersen | Feb. 6, 1990 |
| 5,274,543 ('543 patent) | Zero-Voltage Switching Power Converter with Lossless Synchronous Rectifier Gate Drive | Loftus | Dec. 28, 1993 |
| 5,291,382 ('382 patent) | Pulse Width Modulated DC/DC Converter with Reduced Ripple Current Component Stress and Zero Voltage Switching Capability | Cohen | March 1, 1994 |
| 5,303,138 ('138 patent) | Low Loss Synchronous Rectifier for Application to Clamped-Mode Power Converters | Rozman | April 12, 1994 |
| 5,434,768 ('768 patent) | Fixed Frequency Converter Switching at Zero Voltage | Jitaru, et al. | July 18, 1995 |
| 5,528,482 ('482 patent) | Low Loss Synchronous Rectifier for Application to Clamped-Mode Power Converters | Rozman | June 18, 1996 |
| 5,541,828 ('828 patent) | Multiple Output Converter with Continuous Power Transfer to an Output and with Multiple Output Regulation | Rozman | July 30, 1996 |
| 5,590,032 ('032 patent) | Self-Synchronized Drive Circuit for a Synchronous Rectifier in a Clamped-Mode Power Converter | Bowman, et al. | Dec. 31, 1996 |
| 5,625,541 ('541 patent) | Low Loss Synchronous Rectifier for Application to Clamped-Mode Power Converters | Rozman | April 29, 1997 |

The above-listed applications are commonly assigned with the present invention. The above-listed applications and patents are incorporated herein by reference as if reproduced herein in their entirety.

TECHNICAL FIELD OF THE INVENTION

The present invention is directed, in general, to power conversion and, more specifically, to a drive compensation circuit for a synchronous rectifier in a power converter and a power converter employing the same.

BACKGROUND OF THE INVENTION

A power converter is a power processing circuit that converts an input voltage waveform into a specified output voltage waveform. In many applications requiring a DC output, switched-mode DC—DC converters are frequently employed to advantage. DC—DC converters generally include an inverter, a transformer having a primary winding coupled to the inverter and a rectifier coupled to a secondary winding of the transformer. The inverter generally includes a switching device, such as a field-effect transistor (FET), that converts the DC input voltage to an AC voltage. The transformer then transforms the AC voltage to another value and the rectifier generates the desired DC voltage at the output of the DC—DC converter.

Conventionally, the rectifier includes passive rectifying devices, such as Schottky diodes, that conduct the load current only when forward-biased in response to the input waveform to the rectifier. Passive rectifying devices, however, cannot achieve forward voltage drops of less than about 0.35 volts, thereby substantially limiting a conversion efficiency of the DC—DC converter. To achieve an acceptable level of efficiency, DC—DC converters that provide low output voltages (e.g., 1 volt) often require rectifying devices that have forward voltage drops of less than about 0.1 volts. The DC—DC converters, therefore, generally use synchronous rectifiers. A synchronous rectifier replaces the passive rectifying devices of the conventional rectifier with rectifier switches, such as FETs or other controllable switches, that are periodically driven into conduction and non-conduction modes in synchronism with the periodic waveform of the AC voltage. The rectifier switches exhibit resistive-conductive properties and may thereby avoid the higher forward voltage drops inherent in the passive rectifying devices.

One difficulty with using a rectifier switch (e.g., an n-channel silicon FET) is the need to provide a drive signal that alternates between a positive voltage to drive the device into the conduction mode and a zero or negative voltage to drive the device into the non-conduction mode. Although a capacitive charge within the rectifier switch may only be 30 to 50 nanocoulombs, the rectifier switch requires a high drive current for a brief period of time to change conduction modes. Typical drive currents may be 10 amperes or greater, lasting for tens of nanoseconds. The need to provide substantial power to the rectifier switch to change conduction modes thus reduces some of the advantages of the synchronous rectifier.

The '138 patent, the '482 patent and the '541 patent all describe the use of the secondary winding of the transformer to directly drive the synchronous rectifier. The recognition of the availability of suitable drive voltages from the secondary winding over the entire switching cycle of the inverter led to the development of self-synchronized synchronous rectifiers as disclosed in the aforementioned patents.

The '032 patent describes the use of extra windings in the transformer and voltage-limiting switches to improve the control of the drive signal. The extra windings are particularly useful when the output voltage is so low that the secondary winding does not develop sufficient voltage to ensure that the rectifier switch is fully driven into the conduction mode. The voltage-limiting switches are useful when the input or output voltages are variable, resulting in wide voltage variations in the drive signal. The extra windings and voltage-limiting switches thus allow the transformer to provide drive signals of sufficient voltage to efficiently operate the synchronous rectifier.

When the switching frequency of a DC—DC converter is increased to achieve a more compact design, however, the energy required to charge and discharge the internal capacitance of the rectifier switch can result in substantial losses, detracting from, and ultimately limiting, the benefits of the low conduction mode resistance of the rectifier switch. As the duty cycle of the inverter changes to accommodate variations in either the load or the input or output voltage, wide variations in the voltage of the drive signal may result. Further, the transformer generates voltages of both positive and negative polarity, charging the control terminal of the rectifier switch to both positive and negative voltages. The variable nature of the drive signal detracts from the efficiency of the synchronous rectifier and presents an obstacle to increasing the switching frequency of the inverter.

Accordingly, what is needed in the art is a drive compensation circuit for driving the rectifier switch that avoids unnecessarily charging the control terminal of the rectifier switch to substantially negative voltages in the non-conduction mode and further avoids charging the control terminal of the rectifier switch to unnecessarily high positive voltages during the conduction mode, thereby increasing an efficiency of the synchronous rectifier. Additionally, in synchronous rectifiers employing at least two rectifier switches, a drive compensation circuit that equalizes the voltages applied to the control terminals of the rectifier switches may further increase the efficiency of the power converter.

SUMMARY OF THE INVENTION

To address the above-discussed deficiencies of the prior art, the present invention provides, for use with a synchronous rectifier (or a rectifier) coupled to a secondary winding of a transformer and having a rectifier switch, a circuit for, and method of driving the rectifier switch and a power converter employing the circuit or the method. In one aspect of the present invention wherein the synchronous rectifier has at least first and second rectifier switches, the circuit includes: (1) a series-coupled drive winding and capacitor, coupled between a first control terminal of the first rectifier switch and a second control terminal of the second rectifier switch, that generates first and second drive signals and delivers the first and second drive signals to the first and second control terminals, respectively, and (2) first and second clamps, coupled to the first and second control terminals, respectively, that control first and second capacitive charges within the first and second rectifier switches to limit voltage excursions of the first and second drive signals.

In another aspect of the present invention wherein the rectifier has a rectifier switch and a rectifying device, the circuit includes: (1) a series-coupled drive winding and capacitor, coupled between a control terminal of the rectifier switch and a terminal of the rectifying device, that generates a drive signal and delivers the drive signal to the control terminal, and (2) a clamp, coupled to the control terminal, that controls a capacitive charge within the rectifier switch to limit a voltage excursion of the drive signal.

The present invention therefore introduces a circuit (drive compensation circuit) that reduces an amount of charge transferred to a control terminal of one or more rectifier switches and thereby increases an overall efficiency of the synchronous rectifier. The drive compensation circuit avoids unnecessarily charging the control terminal(s) of the rectifier switch(es) to substantially negative voltages in the non-conduction mode and further avoids charging the control terminal(s) of the rectifier switch(es) to unnecessarily high positive voltages during the conduction mode. Further, when the synchronous rectifier contains at least first and second rectifier switches, the charge from one rectifier switch may be transferred to the other rectifier switch during alternating portions of the switching cycle of the inverter. The drive compensation circuit can equalize the voltages at the control terminals of the rectifier switches, thereby avoiding the unequal drive voltages normally associated with self-driven synchronous rectifiers.

In one embodiment of the present invention, the drive winding is magnetically coupled to the transformer. In an alternative embodiment, the drive winding is magnetically coupled to an auxiliary transformer in electrical communication with the transformer.

In one embodiment of the present invention, the clamp(s) includes a diode. The diode alters a charge in the capacitor to adjust a lower voltage excursion of the drive signal supplied to the control terminal(s) of the rectifier switch(es). Of course, the diode could be a Zener diode to clamp a positive voltage excursion of the drive signal.

In another embodiment of the present invention, the clamp(s) includes a resistor. In an embodiment to be illustrated and described, the clamp(s) includes a diode and a resistor. The resistor, while not necessary to the clamp(s), discharges a portion of the charge within the rectifier switch (es) to a node of the synchronous rectifier. Due to fluctuations in the load, the synchronous rectifier may require a reduced charge. The resistor, therefore, enables the charge in the rectifier switch(es) to be reduced.

In another embodiment, the clamp(s) includes a transistor. The transistor may be self-driven or may be driven by a control circuit. By replacing the diode with the transistor, the voltage drop across the diode may be reduced.

In one embodiment of the present invention, the rectifier switch(es) is a metal oxide semiconductor field-effect transistor (MOSFET). In an alternative embodiment, the rectifier switch(es) is a gallium-arsenide field-effect transistor (GaAsFET). Those skilled in the pertinent art will understand, however, that other controllable switches may be employed to advantage, depending upon the desired application.

In one embodiment of the present invention, the drive compensation circuit further includes a resistor series coupled to the drive winding and capacitor. The resistor, while not necessary to the present invention, damps at least a portion of any ringing that may occur within the drive signal. Typically, the control terminal(s) of the rectifier switch(es) presents a resistance to the external circuitry. If the intrinsic resistance of the rectifier switch(es) is not sufficient to control parasitic ringing in the drive compensation circuit, additional resistance may be required.

In one embodiment of the present invention, the drive compensation circuit further includes an auxiliary capacitor coupled to one of the control terminals to substantially equalize the drive signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
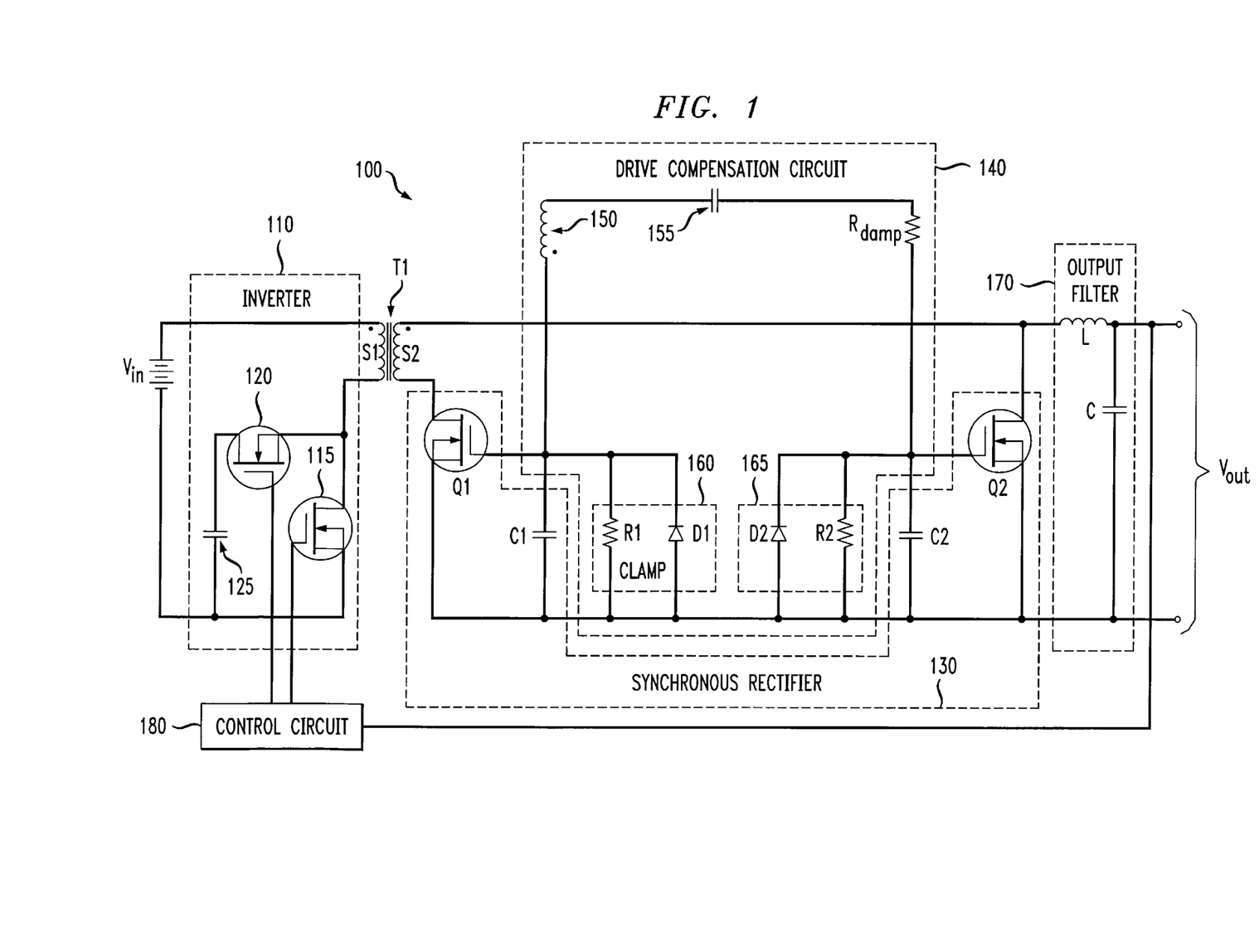
FIG. 1 illustrates a schematic diagram of an embodiment of a power converter constructed according to the principles of the present invention.

Referring initially to FIG. 1, illustrated is a schematic diagram of an embodiment of a power converter 100 constructed according to the principles of the present invention. The power converter 100 includes an inverter 110 coupled to an input of the power converter 100. The power converter 100 further includes a transformer T1 having a primary winding S1 coupled to the inverter 110 and a secondary winding S2. The power converter 100 further includes a synchronous rectifier 130 having first and second rectifier switches Q1, Q2. The synchronous rectifier 130 is coupled to the secondary winding S2 and rectifies a periodic waveform supplied by the secondary winding S2. The power converter 100 further includes a drive compensation circuit 140 that generates and delivers first and second drive signals to the first and second rectifier switches Q1, Q2 of the synchronous rectifier 130. The power converter 100 further includes an output filter 170, having an output inductor L and an output capacitor C, that filters the rectified waveform to supply a DC output voltage Vout at an output of the power converter 100. The power converter 100 still further includes a control circuit 180, coupled to the inverter 110, that monitors the DC output voltage Vout and adjusts the switching cycle of inverter 110 to regulate the DC output voltage Vout.

In the illustrated embodiment, the inverter 110 includes a power switch 115 coupled to the input of the power converter 100. The control circuit 180 periodically switches the power switch 115 to impress a DC input voltage Vin across the primary winding S1. The inverter 110 further includes a series-coupled auxiliary switch 120 and capacitor 125, coupled across the power switch 115, that clamps a voltage across the windings of the transformer T1 when the power switch 115 is in a non-conduction mode. While the embodiment illustrated and described contains an inverter 110 with an active clamp forward switching topology, those skilled in the art will realize that the principles of the present invention may be employed with a wide variety of switching topologies, including, but not limited to, those described herein.

The first and second rectifier switches Q1, Q2 of the synchronous rectifier 130 are coupled to the secondary winding S2. In the illustrated embodiment, the first and second rectifier switches Q1, Q2 are n-channel metal oxide semiconductor field-effect transistors (MOSFETs) controllably switched by the drive compensation circuit 140 to rectify the periodic waveform supplied by the secondary winding S2. Of course, other controllable switches, such as bipolar junction transistors (BJTs) and gallium arsenide field-effect transistors (GaAsFETs), are well within the broad scope of the present invention. The first and second rectifier switches Q1, Q2 have intrinsic capacitance therein, explicitly represented in FIG. 1 by first and second input capacitors C1, C2 coupled respectively to first and second control terminals of the first and second rectifier switches Q1, Q2.

The drive compensation circuit 140 includes a series-coupled drive winding 150 and capacitor (drive compensation capacitor) 155 coupled between the transformer T1 and the first and second control terminals of the first and second rectifier switches Q1, Q2. In the illustrated embodiment, the drive winding 150 is magnetically coupled to the transformer T1. The drive winding 150 and drive compensation capacitor 155 generate and deliver the first and second drive signals to the first and second control terminals of the first and second rectifier switches Q1, Q2. A turns ratio of the drive winding 150 with respect to the primary winding S1 determines the drive voltages of the first and second drive signals. Properly selecting the turns ratio ensures sufficient drive voltage for the first and second rectifier switches Q1, Q2 over an entire operating cycle and permitted range of the DC input voltage Vin. In the illustrated embodiment of the present invention, the drive compensation circuit 140 further includes a resistor Rdamp series coupled to the drive winding 150 and the drive compensation capacitor 155. The resistor Rdamp, while not necessary to the present invention, damps at least a portion of any ringing that may occur within the first and second drive signals. While the first and second control terminals of the first and second rectifier switches Q1, Q2 present resistances to the external circuitry, the resistances may not be sufficient to control parasitic ringing in the drive compensation circuit 140. The external resistor Rdamp, therefore, may be added to the drive compensation circuit 140 to control the parasitic ringing.

The drive compensation circuit 140 further includes first and second clamps 160, 165 coupled to the first and second control terminals of the first and second rectifier switches Q1, Q2, respectively. In the illustrated embodiment, the first clamp 160 includes a first clamping diode D1 and a first discharge resistor R1. The second clamp 165 likewise includes a second clamping diode D2 and a second discharge resistor R2. The first and second discharge resistors R1, R2, while not necessary to the first and second clamps 160, 165, discharge a portion of the capacitive charges within the first and second rectifier switches Q1, Q2, respectively, to a node of the synchronous rectifier 130. While the present embodiment employs clamping diodes and discharge resistors, those skilled in the art realize that the use of other clamping devices is well within the broad scope of the present invention.

The power converter 100 operates as follows. In steady-state operation, the power switch 115 closes for a primary duty cycle D to impress the DC input voltage Vin across the primary winding S1. The power switch 115 then opens for a complementary duty cycle 1-D to allow the auxiliary switch 120 to reset the transformer T1.

An undesirable attribute of conventional self-driven or transformer driven synchronous rectifiers is the variability of the drive signals as a function of duty cycle, input voltage and output voltage. The drive signal to a particular rectifier switch is usually at its lowest level when the rectifier switch is in the conduction mode for the longest portion of the switching cycle, thereby detrimentally affecting conversion efficiency. Additionally, the rectifier switches of conventional self-driven synchronous rectifiers are usually driven with drive signals having unequal voltages, which may also detrimentally affect conversion efficiency.

The drive compensation circuit 140, therefore, adjusts an amount of charge transferred to the control terminals of the first and second rectifier switches Q1, Q2 to increase an overall efficiency of the synchronous rectifier 130. The drive winding 150 and the drive compensation capacitor 155 generate and deliver first and second drive signals to the first and second control terminals of the first and second rectifier switches Q1, Q2, respectively. The first and second clamps 160, 165 control the charges of the first and second input capacitors C1, C2, respectively, to limit the voltage excursions of the first and second drive signals.

During steady-state operation, the power switch 115 is in the conduction mode for a primary duty cycle D and is in the non-conduction mode for an complementary duty cycle 1-D. A voltage of the first drive signal is a first voltage V1 during the primary duty cycle D and a substantially zero voltage (e.g., a diode drop below zero) during the complementary duty cycle 1-D. A voltage of the second drive signal is a second voltage V2 during the complementary duty cycle 1-D and a substantially zero voltage during the primary duty cycle D. In the illustrated embodiment, the first and second rectifier switches Q1, Q2 are MOSFETs. Of course, the use of other controllable switches is well within the scope of the present invention. The first and second input capacitors C1, C2 represent the total gate-to-source capacitances of the first and second rectifier switches Q1, Q2, respectively. In the illustrated embodiment, the drive winding 150 generates a substantially rectangular waveform having a first winding voltage Va during the primary duty cycle D and a second winding voltage −Vb during the complementary duty cycle 1-D. The first and second voltages V1, V2 are positive with respect to a node of the synchronous rectifier 130. Of course, other voltage polarities may be employed to advantage with other types of controllable switches.

In the illustrated embodiment, the drive compensation capacitor 155 is of sufficient size to maintain a substantially DC voltage thereacross, Vcomp, during steady-state operation. Applying an idealized analysis (neglecting parasitic and other non-ideal effects) yields the following relations for the first and second voltages V1, V2 and the voltage Vcomp across the drive compensation capacitor 155:

$$V1 = \frac{C2}{C1+C2}(Va+Vb)$$

$$V2 = \frac{C1}{C1+C2}(Va+Vb)$$

$$Vcomp = \frac{1}{C1+C2}(C2Va - C1Vb)$$

From the above equations, it is apparent that the first voltage V1 is equal to the second voltage V2 if the first and second input capacitors C1, C2 are substantially equal. Therefore, in contrast to the conventional self-driven synchronous rectifiers, the present invention is capable of providing first and second drive signals having substantially equal first and second voltages V1, V2 to the first and second rectifier switches Q1, Q2 in a self-driven manner. In addition, the second drive signal to second rectifier switch Q2 is maintained at a higher level when the second rectifier switch Q2 conducts for a substantial portion of the switching cycle, thereby enhancing conversion efficiency.

By limiting a negative excursion of the first and second drive signals, the drive compensation circuit 140 reduces an amount of charge transferred to one or more rectifier switches Q1, Q2 and thereby increases an overall efficiency of the synchronous rectifier 130. The drive compensation circuit 140 thus avoids unnecessarily charging the first and second control terminals of the first and second rectifier switches Q1, Q2 to substantially negative voltages in the non-conduction mode. Further, the drive compensation circuit 140 avoids charging the first and second control terminals of the first and second rectifier switches Q1, Q2 to unnecessarily high positive voltages during the conduction mode. Additionally, the charge from one of the rectifier switches Q1, Q2 is transferred to the other of the rectifier switches Q2, Q1 during alternating portions of the switching cycle of the inverter 110.

In an advantageous embodiment, the first and second input capacitors C1, C2 of the first and second rectifier switches Q1, Q2 are substantially equal. The drive compensation capacitor 155, therefore, cooperates with the first and second clamps 160, 165 to balance the first and second conduction voltages V1, V2 of the first and second drive signals. A substantially constant charge may thus be periodically transferred between the first and second control terminals of the first and second rectifier switches Q1, Q2 in synchronism with the periodic duty cycle of the power switch 115. By balancing the first and second conduction voltages V1, V2, the first and second control terminals of the first and second rectifier switches Q1, Q2 may be limited from substantially negative voltage excursions. Similarly, the first and second control terminals may be driven equally positive during the conduction period of each of the rectifier switches Q1, Q2. The drive compensation circuit 140 thus allows the negative and positive voltage excursions of the first and second conduction voltages V1, V2, to be balanced without regard to the duty cycle of the inverter 110. Of course, if the input capacitors C1, C2 of the first and second rectifier switches Q1, Q2 are not equal, an external capacitor maybe coupled to the control terminal of one of the rectifier switches Q1, Q2 to balance the input capacitances.

With prior art techniques wherein the first and second conduction voltages V1, V2 are unequal, a turns ratio of the drive winding 150 is necessarily determined by the lower conduction voltage. Consequently, the turns ratio of the drive winding 150 must be increased until the lower conduction voltage is sufficient to drive the first and second rectifier switches Q1, Q2 into the conduction mode. By balancing the first and second conduction voltages V1, V2 as disclosed herein, the turns ratio of the drive winding 150 may be reduced while maintaining the minimum voltage required to drive the first and second rectifier switches Q1, Q2 into the conduction mode.

Figure 2:
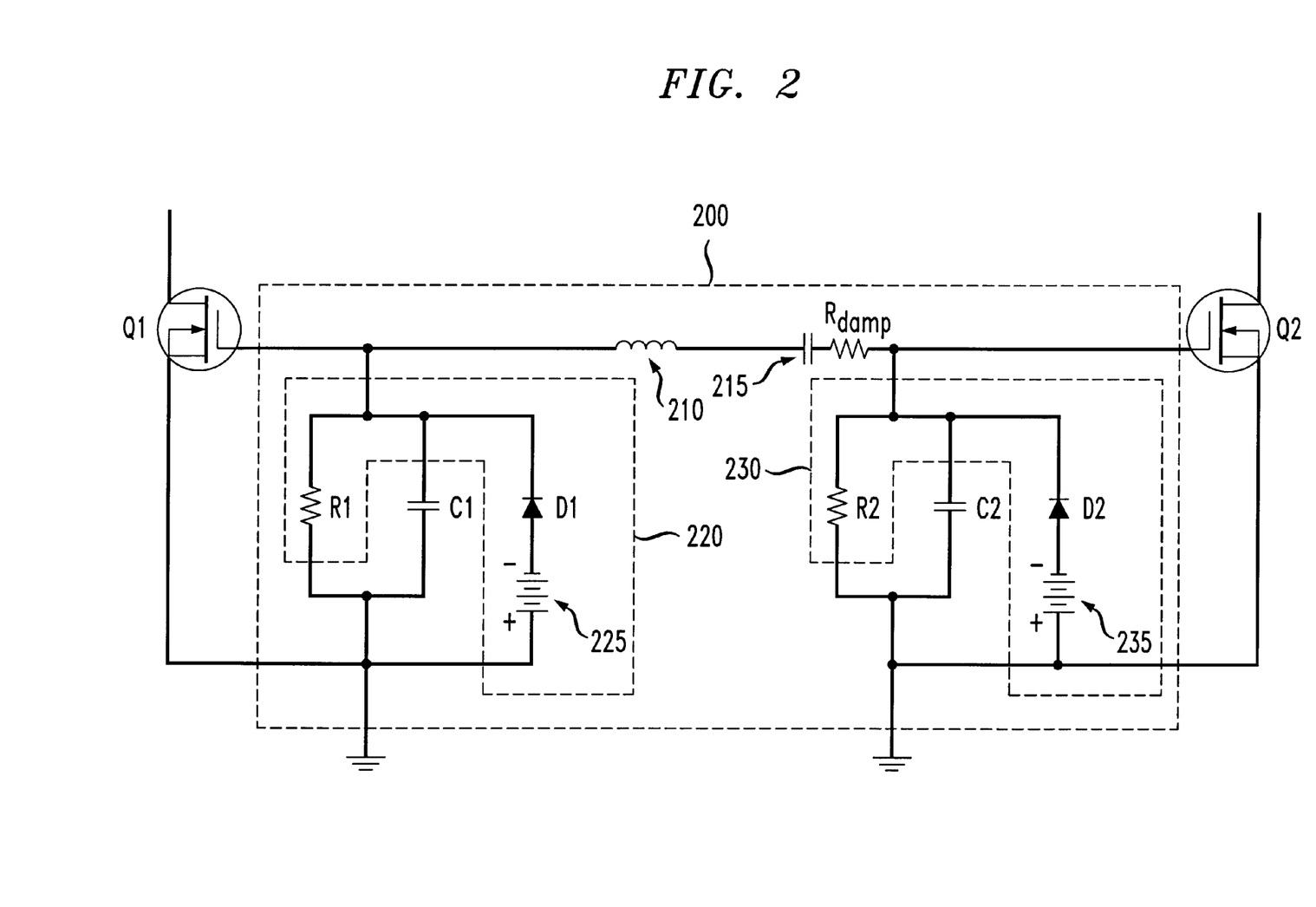
FIG. 2 illustrates a schematic diagram of an embodiment of a drive compensation circuit constructed according to the principles of the present invention.

Turning now to FIG. 2, illustrated is a schematic diagram of an embodiment of a drive compensation circuit 200 constructed according to the principles of the present invention. The drive compensation circuit 200 is capable of clamping the negative excursions of the first and second drive signals to a voltage other than the substantially zero voltage as disclosed with respect to FIG. 1. The drive compensation circuit 200 includes a series-coupled drive winding 210 and drive compensation capacitor 215 that generates and delivers first and second drive signals to first and second control terminals of first and second rectifier switches Q1, Q2, respectively. To better illustrate the present invention, intrinsic capacitive charges within the first and second rectifier switches Q1, Q2 are explicitly illustrated as first and second input capacitors C1, C2. The drive compensation circuit 200 further includes a resistor Rdamp series coupled to the drive winding 210 and drive compensation capacitor 215. The resistor Rdamp, while not necessary to the present invention, damps at least a portion of any ringing that may occur within the first and second drive signals when the intrinsic resistances of the first and second rectifier switches Q1, Q2 are insufficient to damp the ringing.

The drive compensation circuit 200 further includes first and second clamps 220, 230 coupled respectively to the first and second control terminals of the first and second rectifier switches Q1, Q2. In the illustrated embodiment, the first clamp 220 includes a first diode D1 series coupled to a first source of DC voltage 225. The first clamp 220 further includes a first resistor R1. The first resistor R1, the first diode D1 and first source of DC voltage 225 are coupled to the first control terminal of the first rectifier switch Q1. The second clamp 230 includes a second diode D2 series coupled to a second source of DC voltage 235. The second clamp 230 further includes a second resistor R2. The second resistor R2, the second diode D2 and second source of DC voltage 235 are coupled to the second control terminal of the second rectifier switch Q2. The first and second resistors R1, R2, while not while not necessary to the first and second clamps 220, 230, discharge a portion of the charge within the first and second rectifier switches Q1, Q2, respectively, to a node to accommodate rapid changes in the operational condition of the drive compensation circuit 200. The first and second sources of DC voltage 225, 235 are, likewise, not necessary to the first and second clamps 220, 230. In a preferred embodiment, the first and second sources of DC voltage 225, 235 provide a small negative voltage (e.g., −2 volts). The first and second rectifier switches Q1, Q2 may thus be driven into the non-conduction mode with negative voltages thereby avoiding spurious conduction due to ringing in the first and second drive signals. While the illustrated embodiment depicts the first and second sources of DC voltage 225, 235 as first and second batteries, respectively, those skilled in the pertinent art are familiar with other devices or circuits capable of providing the negative voltage. Of course, the polarities of the voltages provided by the first and second sources of DC voltage 225, 235 will depend on the type of rectifier switches Q1, Q2 employed.

In an alternative embodiment, the first and second clamps 220, 230 may be first and second transistors. In one embodiment, analogous to that described in the '181 application, the first and second transistors may be self-driven. Of course, methods of driving the first and second transistors other than that disclosed in the '181 application may be employed to advantage. In another embodiment, the first and second transistors may be driven by a control circuit. A timing delay in the control circuit may be advantageous to avoid inadvertently discharging the first and second input capacitors C1, C2, which may cause a charge imbalance in the synchronous rectifier.

Figure 3:
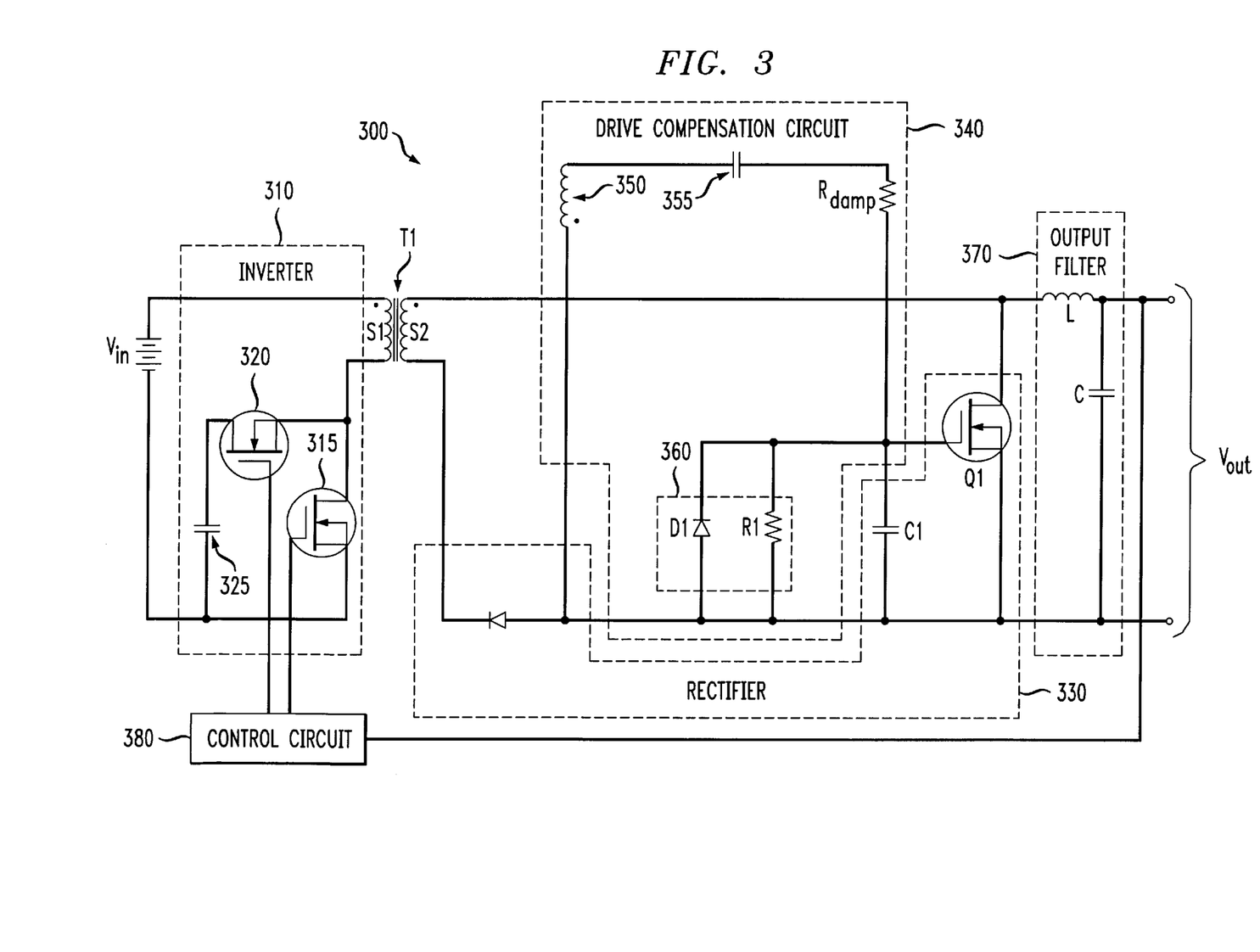
FIG. 3 illustrates a schematic diagram of another embodiment of a power converter constructed according to the principles of the present invention.

Turning now to FIG. 3, illustrated is a schematic diagram of another embodiment of a power converter 300 constructed according to the principles of the present invention. The power converter 300 includes a transformer T1 having a primary winding S1 and a secondary winding S2. The power converter 300 further includes an inverter 310 that couples the primary winding S1 to an input of the power converter 300. In the illustrated embodiment, the inverter 310 includes a power switch 315 that periodically switches to impress a DC input voltage Vin across the primary winding S1. The inverter 310 further includes a series-coupled auxiliary switch 320 and capacitor 325 that clamps a voltage across the windings of the transformer T1 when the power switch 315 is in a non-conduction mode. While the embodiment illustrated and described contains an inverter 310 with an active clamped forward switching topology, those skilled in the art will realize that the principles of the present invention may be employed with a wide variety of switching topologies, including, but not limited to those described herein.

The power converter 300 further includes a rectifier 330, coupled to the secondary winding S2, that rectifies a periodic waveform supplied by the secondary winding S2. The power converter 300 further includes a drive compensation circuit 340, coupled to the rectifier 330. An output filter 370, having an output inductor L and an output capacitor C, filters the rectified waveform to supply a DC output voltage Vout at an output of the power converter 300. The power converter 300 further includes a control circuit 380, coupled to the inverter 310, that monitors the DC output voltage Vout and adjusts the switching cycle of inverter 310 to regulate the DC output voltage Vout.

While the synchronous rectifier 130 of FIG. 1 employs first and second rectifier switches, under certain conditions wherein the primary and complementary duty cycles are substantially unequal, it may be advantageous to replace the first or second rectifier switch with a rectifying device (rectifying diode). In the illustrated embodiment, the rectifier 330 includes a rectifier switch Q1 and a rectifying diode D. The drive compensation circuit 340, therefore, may be modified to accommodate the rectifier 330. The drive compensation circuit 340 thus includes a series-coupled drive winding 350 and drive balancing capacitor 355 that provides a drive signal to a control terminal of the rectifier switch Q1. To better illustrate the present invention, the input capacitance of the rectifier switch Q1 is explicitly illustrated as input capacitor C1. The drive compensation circuit 340 further includes a damping resistor Rdamp, series coupled to the drive winding 350. The drive compensation circuit 340 still further includes a clamping device 360 coupled across the input capacitor C1. In the illustrated embodiment, the clamping device 360 includes a diode D1 and a discharge device R1 coupled across the input capacitor C1.

The power converter 300 operates as follows. The power switch 315 closes for a primary duty cycle D to impress the DC input voltage Vin across the primary winding S1. The power switch 315 then opens for a complementary duty cycle 1-D to allow the auxiliary switch 320 and the capacitor 325 to reset the transformer T1. In the illustrated embodiment, the primary duty cycle D is substantially less than the complementary duty cycle 1-D. The diode D1, therefore, carries current during the primary duty cycle D, while the rectifier switch Q1 carries current during the complementary duty cycle 1-D. Since the rectifier switch Q1 carries a major portion of the output current, losses incurred by the diode D1 are minimal. While the embodiment illustrated has the diode in a position to carry current during the primary duty cycle D, those skilled in the art will realize that the diode may also be interchanged with the rectifier switch Q1 if the primary duty cycle D is greater than the complementary duty cycle 1-D. Of course, the positions of the diode D and the rectifier switch Q1 may be interchanged for use with other topologies such as a flyback rectifier topology.

Figure 4:
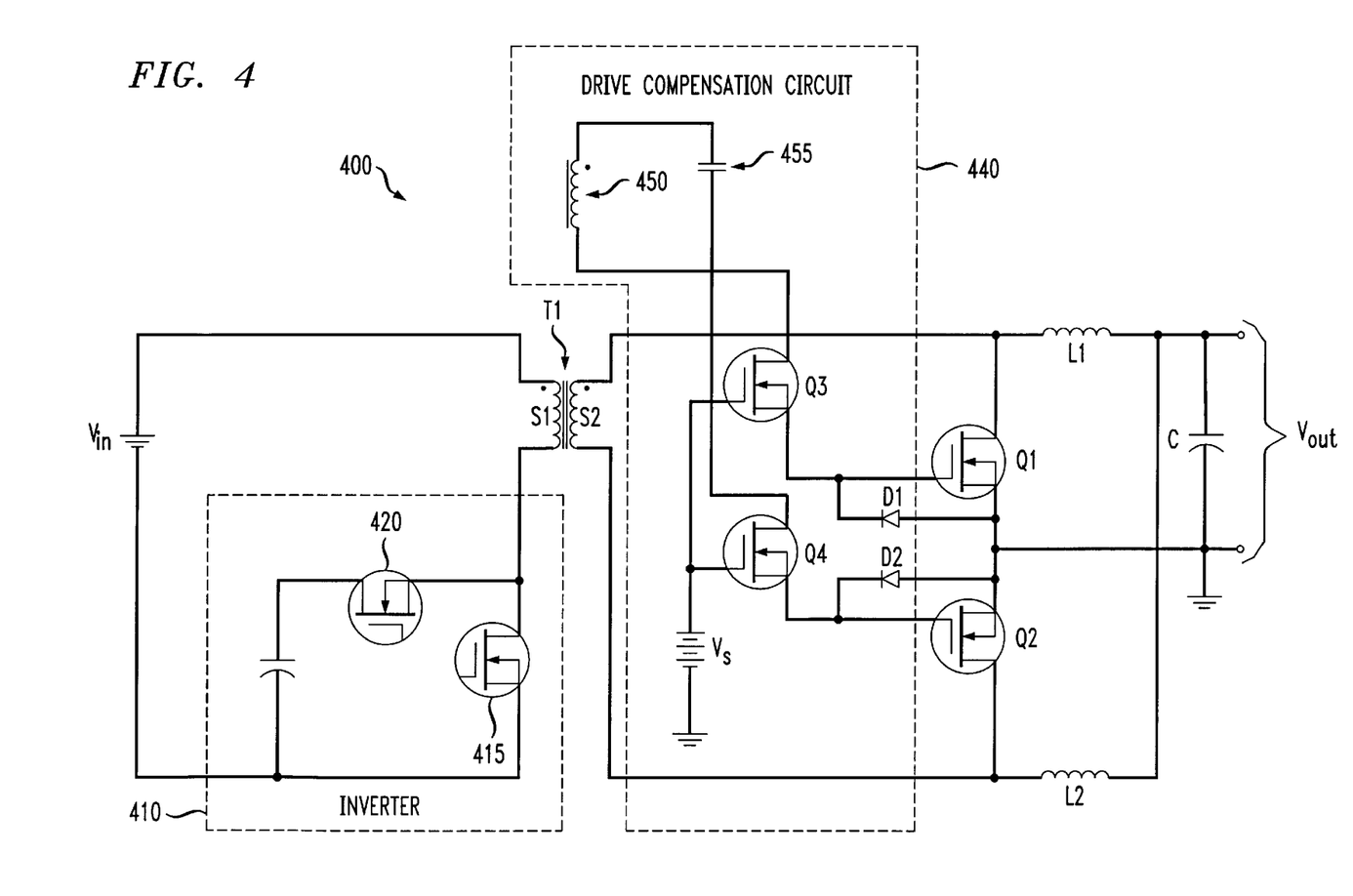
FIG. 4 illustrates a schematic diagram of another embodiment of a power converter constructed according to the principles of the present invention.

Turning now to FIG. 4, illustrated is a schematic diagram of another embodiment of a power converter 400 constructed according to the principles of the present invention. The power converter 400 includes a transformer T1 having a primary winding S1 and a secondary winding S2. The power converter 400 further includes an inverter 410 having a power switch 415 that switches to couple the primary winding S1 to an input of the power converter 400. The power converter 400 further includes a synchronous rectifier, having first and second rectifier switches Q1, Q2, that rectifies a periodic waveform supplied by the secondary winding S2. The power converter 400 further includes a drive compensation circuit 440 coupled to the synchronous rectifier. An output filter, having first and second output inductors L1, L2 and an output capacitor C, filters the rectified waveform to supply a DC output voltage at an output of the power converter 400.

In the illustrated embodiment, the first and second rectifier switches Q1, Q2 of the synchronous rectifier are configured in a hybridge configuration. Of course, the principles of the present invention are applicable to a variety of synchronous rectifier configurations including, for instance, a half wave rectifier, a tapped winding full wave rectifier, a multiple transformer rectifier and a flyback rectifier.

The drive compensation circuit 440 includes a drive winding 450 series coupled to a drive compensation capacitor 455. The drive compensation circuit 440 further includes first and second clamping devices having first and second diodes D1, D2, respectively. The drive compensation circuit 440 further includes first and second voltage limiting switches Q3, Q4 that limit the voltages of the first and second drive signals, respectively. The drive compensation circuit 440 still further includes a source of DC voltage Vs that establishes a threshold voltage of the first and second voltage limiting switches Q3, Q4 to limit the voltage excursions of the first and second drive signals. The first and second voltage limiting switches Q3, Q4 are further described in the '543 patent and the '032 patent and are not necessary to the present invention.

Figure 5:
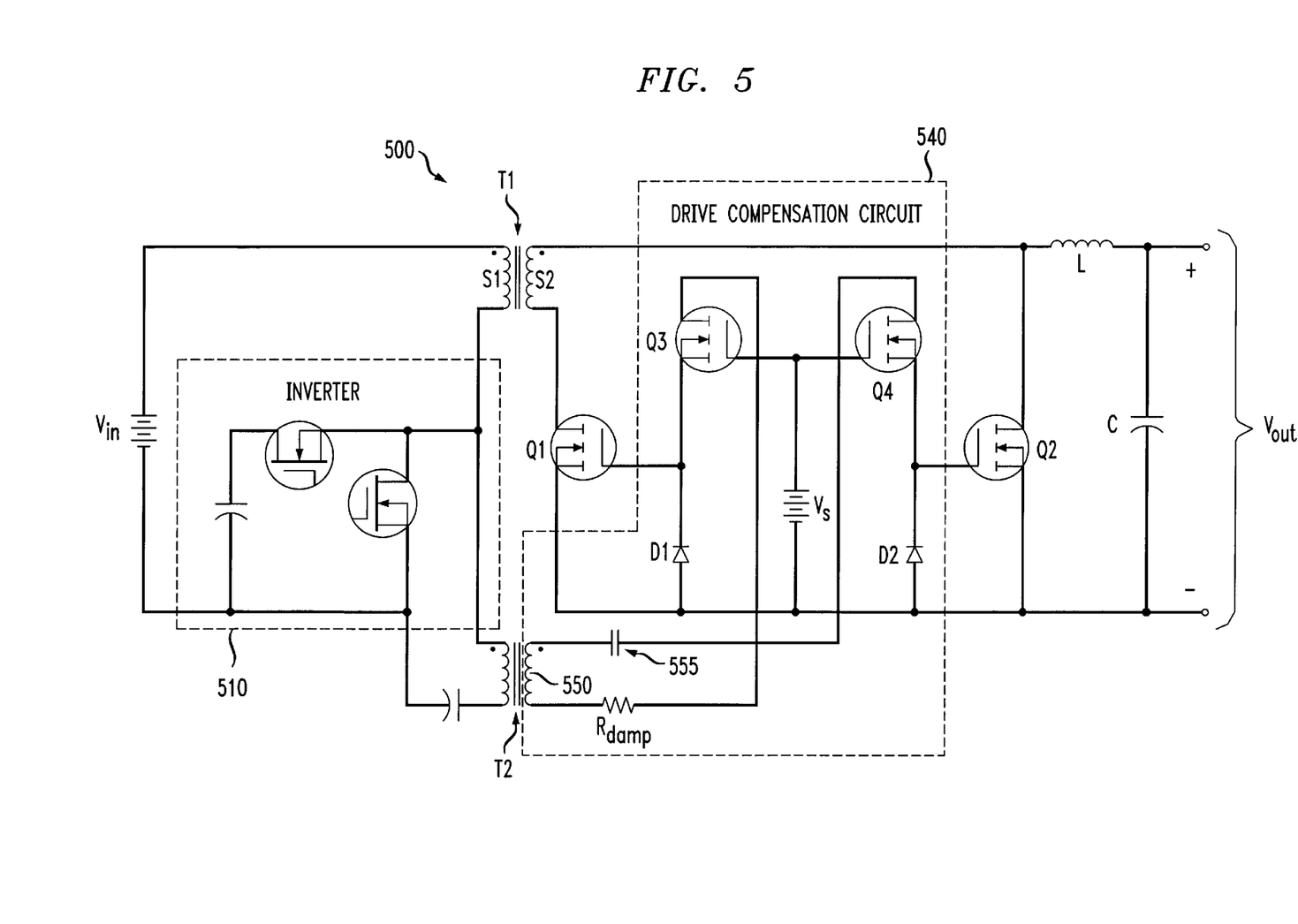
FIG. 5 illustrates a schematic diagram of another embodiment of a power converter constructed according to the principles of the present invention.

Turning now to FIG. 5, illustrated is a schematic diagram of another embodiment of a power converter 500 constructed according to the principles of the present invention. The power converter 500 includes a power transformer T1 having a primary winding S1 and a secondary winding S2. The power converter 500 further includes an auxiliary transformer T2. The power converter 500 further includes an inverter 510 that switches to couple the power transformer T1 and the auxiliary transformer T2 to an input of the power converter 500.

The power converter 500 further includes a synchronous rectifier, having first and second rectifier switches Q1, Q2, that rectifies a periodic waveform supplied by the secondary winding S2.

The power converter 500 further includes a drive compensation circuit 540, coupled to the synchronous rectifier. An output filter, having an output inductor L and an output capacitor C, filters the rectified waveform to supply a DC output voltage Vout at an output of the power converter 500.

The drive compensation circuit 540 includes a drive winding 550 magnetically coupled to the auxiliary transformer T2. A drive compensation capacitor 455 and a damping resistor Rdamp are series coupled to the drive winding 550. The drive compensation circuit 540 further includes first and second clamping devices having first and second diodes D1, D2, respectively. The drive compensation circuit 540 further includes first and second voltage limiting switches Q3, Q4 that limit the voltages of the first and second drive signals, respectively. The drive compensation circuit 540 still further includes a source of DC voltage Vs that establishes a threshold voltage of the first and second voltage limiting switches Q3, Q4 to limit the voltage excursions of the first and second drive signals. The first and second voltage limiting switches Q3, Q4 are further described in the '543 patent and the '032 patent and are not necessary to the present invention.

Figure 6:
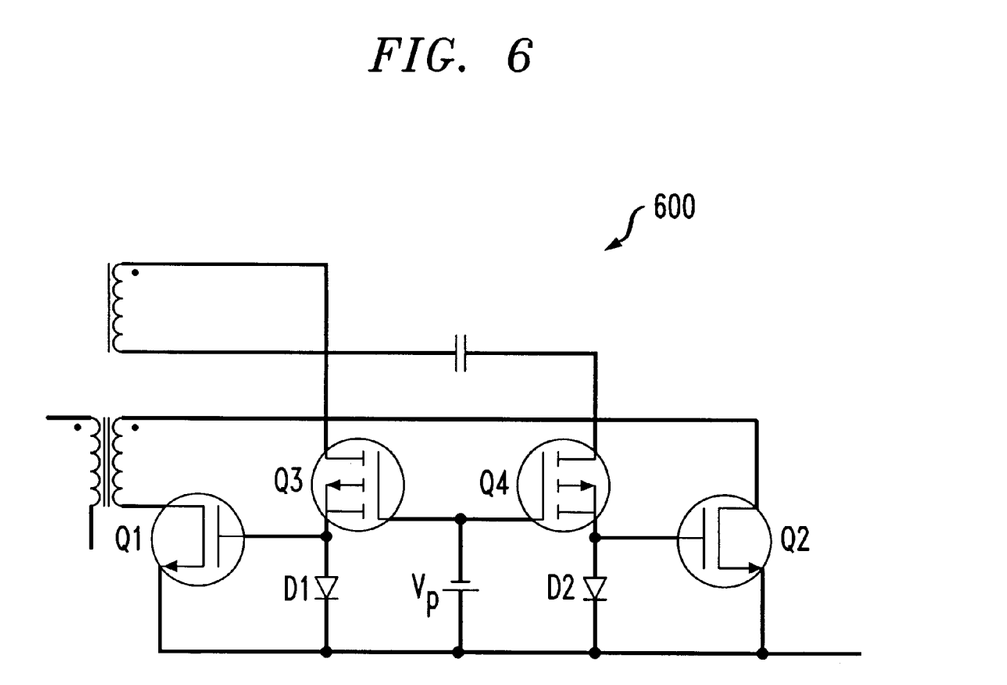
FIG. 6 illustrates a schematic diagram of another embodiment of a drive compensation circuit constructed according to the principles of the present invention.

Turning now to FIG. 6, illustrated is a schematic diagram of another drive compensation circuit 600 constructed according to the principles of the present invention. In illustrated embodiment, the synchronous rectifier employs gallium-arsenide field-effect transistors (GaAsFETs) for the rectifier switches Q1, Q2. Of course, the use of other controllable switches is well within the broad scope of the present invention. The drive compensation circuit 600 is analogous to the drive compensation circuit 540 of FIG. 5 and, as a result, will not be described in detail. While the illustrated drive compensation circuit 600 includes first and second voltage limiting switches Q3, Q4 that limit the voltage excursions of the first and second drive signals, those skilled in the art realize that the first and second voltage limiting switches Q3, Q4 are not required to practice the present invention.

Those skilled in the art should understand that the previously described embodiments of the power converter and drive compensation circuit are submitted for illustrative purposes only and other embodiments capable of providing equal conduction mode drive voltages or small negative or positive non-conduction mode drive voltages for the control terminals of the rectifying switches of the synchronous rectifier are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies, including circuit topologies not employing an active clamp. Additionally, the drive compensation circuit of the present invention may be used with more than one rectifying switch in a power converter, and with power converters employing more than one drive winding (e.g., forward converter topologies employing a variety of transformer reset schemes, such as resonant reset). Also, the principles of the present invention may be applied to various half bridge, full bridge, flyback, and boost converter topologies employing discrete or integrated magnetics. For a better understanding of a variety of power converter topologies employing discrete and integrated magnetic techniques, see *Modern DC-to-DC Switchmode Power Converter Circuits*, by Rudolph P. Severns and Gordon Bloom, Van Nostrand Reinhold Company, New York, N.Y. (1985), which is incorporated herein by reference in its entirety.

Circuit topologies employing self driven synchronous rectifiers and which may additionally employ the present invention to advantage include, without limitation, an active clamp, two transformer converter (as described in the '382 patent), a hybridge or current doubler topology (as described in the '271 patent) and an active clamp hybridge circuit (as described in the '768 patent). Multiple output topologies (as described in the '828 patent) and half bridge topologies (as described in the '543 patent) may also use the present invention to advantage.

Additionally, other varieties of active clamp topologies employing self driven synchronous rectification or topologies using rectifiers other than MOSFETs (such as GaAsFETs), as described in the '032 patent and the '138 patent, may use the present invention to advantage.

Although the present invention has been described in detail, those skilled in the art should understand that they can make various changes, substitutions and alterations herein without departing from the spirit and scope of the invention in its broadest form.

What is claimed is:

1. For use with a synchronous rectifier coupled to a secondary winding of a transformer and having at least first and second rectifier switches, a circuit for driving said first and second rectifier switches, comprising:
    a series-coupled drive winding and capacitor, coupled between a first control terminal of said first rectifier switch and a second control terminal of said second rectifier switch, that generates first and second drive signals and delivers said first and second drive signals to said first and second control terminals, respectively; and
    first and second clamps, coupled to said first and second control terminals, respectively, that control first and second capacitive charges within said first and second rectifier switches to limit voltage excursions of said first and second drive signals.

2. The circuit as recited in claim 1 wherein said drive winding is magnetically coupled to said transformer.

3. The circuit as recited in claim 1 wherein said drive winding is magnetically coupled to an auxiliary transformer.

4. The circuit as recited in claim 1 wherein at least one of said first and second clamps comprises a diode.

5. The circuit as recited in claim 1 wherein at least one of said first and second clamps comprises a resistor.

6. The circuit as recited in claim 1 wherein at least one of said first and second clamps comprises a transistor.

7. The circuit as recited in claim 1 wherein said first and second rectifier switches are selected from the group consisting of:
    a metal oxide semiconductor field-effect transistor (MOSFET), and a gallium-arsenide field-effect transistor (GaAsFET).

8. The circuit as recited in claim 1 wherein said capacitor substantially equalizes said first and second drive signals.

9. The circuit as recited in claim 1 further comprising an auxiliary capacitor coupled to one of said first and second control terminals to substantially equalize said first and second drive signals.

10. The circuit as recited in claim 1 further comprising a resistor series coupled to said drive winding and capacitor.

11. For use with a rectifier coupled to a secondary winding of a transformer and having at least a rectifier switch and a rectifying device, a circuit for driving said rectifier switch, comprising:
    a series-coupled drive winding and capacitor, coupled to a control terminal of said rectifier switch, that generates a drive signal and delivers said drive signal to said control terminal; and
    a clamp, coupled to said control terminal, that controls a capacitive charge within said rectifier switch to limit a voltage excursion of said drive signal.

12. The circuit as recited in claim 11 wherein said series-coupled drive winding and capacitor is coupled between said control terminal and a second terminal of said rectifier switch.

13. The circuit as recited in claim 11 wherein said drive winding is magnetically coupled to said transformer.

14. The circuit as recited in claim 11 wherein said drive winding is magnetically coupled to an auxiliary transformer.

15. The circuit as recited in claim 11 wherein said clamp comprises a diode.

16. The circuit as recited in claim 11 wherein said clamp comprises a resistor.

17. The circuit as recited in claim 11 wherein said clamp comprises a transistor.

18. The circuit as recited in claim 11 wherein said rectifier switch is selected from the group consisting of
    a metal oxide semiconductor field-effect transistor (MOSFET), and a gallium-arsenide field-effect transistor (GaAsFET).

19. The circuit as recited in claim 11 further comprising a resistor series coupled to said drive winding and capacitor.

20. For use with a rectifier coupled to a secondary winding of a transformer and having a rectifier switch, a method of driving said rectifier switch, comprising:
    generating a drive signal with a series-coupled drive winding and capacitor coupled to a control terminal of said rectifier switch;
    delivering said drive signal to said control terminal; and
    controlling a capacitive charge within said rectifier switch with a clamp to limit a voltage excursion of said drive signal.

21. The method as recited in claim 20 further comprising magnetically coupling said drive winding to said transformer.

22. The method as recited in claim 20 further comprising magnetically coupling said drive winding to an auxiliary transformer.

23. The method as recited in claim 20 wherein said clamp comprises a diode.

24. The method as recited in claim 20 wherein said clamp comprises a resistor.

25. The method as recited in claim 20 wherein said clamp comprises a transistor.

26. The method as recited in claim 20 wherein said rectifier switch is selected from the group consisting of:
    a metal oxide semiconductor field-effect transistor (MOSFET), and
    a gallium-arsenide field-effect transistor (GaAsFET).

27. The method as recited in claim 20 further comprising attenuating said drive signal with a resistor series coupled to said drive winding and capacitor.

28. The method as recited in claim 20 wherein said synchronous rectifier has a second rectifier switch, said series-coupled drive winding and capacitor are further coupled to a second control terminal of said second rectifier switch and said method further comprises controlling a second capacitive charge within said second rectifier switch with another clamp.

29. A power converter, comprising:

an inverter;

at least one transformer having a primary winding coupled to said inverter;

a synchronous rectifier coupled to a secondary winding of said at least one transformer and having first and second rectifier switches; and a circuit for driving said first and second rectifier switches, including:

a series-coupled drive winding and capacitor, coupled between a first control terminal of said first rectifier switch and a second control terminal of said second rectifier switch, that generates first and second drive signals and delivers said first and second drive signals to said first and second control terminals, respectively, and first and second clamps, coupled to said first and second control terminals, respectively, that control first and second capacitive charges within said first and second rectifier switches to limit voltage excursions of said first and second drive signals.

30. The power converter as recited in claim 29 wherein said drive winding is magnetically coupled to said transformer.

31. The power converter as recited in claim 29 wherein said drive winding is magnetically coupled to an auxiliary transformer.

32. The power converter as recited in claim 29 wherein at least one of said first and second clamps comprises a diode.

33. The power converter as recited in claim 29 wherein at least one of said first and second clamps comprises a resistor.

34. The power converter as recited in claim 29 wherein at least one of said first and second clamps comprises a transistor.

35. The power converter as recited in claim 29 wherein said first and second rectifier switches are selected from the group consisting of:

a metal oxide semiconductor field-effect transistor (MOSFET), and a gallium-arsenide field-effect transistor (GaAsFET).

36. The power converter as recited in claim 29 wherein said capacitor substantially equalizes said first and second drive signals.

37. The power converter as recited in claim 29 further comprising an auxiliary capacitor coupled to one of said first and second control terminals to substantially equalize said first and second drive signals.

38. The power converter as recited in claim 29 further comprising a resistor series coupled to said drive winding and capacitor.

39. The power converter as recited in claim 29 wherein said inverter is selected from the group consisting of:

an asymmetrical half bridge, a half bridge, a full bridge, and a forward.

40. The power converter as recited in claim 29 wherein a configuration of said synchronous rectifier and said secondary winding is selected from the group consisting of a half wave rectifier, a tapped winding full wave rectifier, a hybridge rectifier, a multiple transformer rectifier, and a flyback rectifier.

41. The power converter as recited in claim 29 wherein said inverter comprises at least one active clamp.

* * * * *